United States Patent [19]

Hori et al.

[11] 4,129,295
[45] Dec. 12, 1978

[54] SEMIAUTOMATIC DOCUMENT FEEDER

[75] Inventors: Tatsu Hori, Los Altos; Kenneth W. Gardiner, Menlo Park; Norman F. Mangal, Palo Alto, all of Calif.

[73] Assignee: Savin Business Machines Corporation, Valhalla, N.Y.

[21] Appl. No.: 755,181

[22] Filed: Dec. 29, 1976

[51] Int. Cl.² .................................. B65H 29/00
[52] U.S. Cl. ........................ 271/186; 271/209; 271/DIG. 9
[58] Field of Search ........... 271/186, 65, 172, DIG. 9, 271/207, 209, 220

[56] References Cited

U.S. PATENT DOCUMENTS

| | | | |
|---|---|---|---|
| 1,573,414 | 2/1926 | Mahoney | 271/220 X |
| 2,478,850 | 8/1949 | Trump | 271/186 |
| 2,822,170 | 2/1958 | Frantz | 271/172 |
| 3,700,231 | 10/1972 | Aasen | 271/65 X |
| 3,937,456 | 2/1976 | Gruodis | 271/64 |

FOREIGN PATENT DOCUMENTS 789015  1/1958  United Kingdom .................. 271/220

Primary Examiner—Richard A. Schacher
Attorney, Agent, or Firm—Shenier & O'Connor

[57] ABSTRACT

A document feeder for moving documents across an upwardly facing imaging platen of a copying machine includes a stacking tray disposed above the platen and in substantially parallel relationship therewith. A first guide element guides documents moving off the imaging platen at one edge thereof along an upwardly extending curved path and discharges the documents at one end of the stacking tray along an upwardly directed trajectory. A second guide element intercepts documents discharged along the upwardly directed trajectory at a location above the top of the tray and guides the documents downwardly into the stacking tray, thus obviating interference between a document moving into the tray and a bent or curled document already in the tray.

20 Claims, 6 Drawing Figures

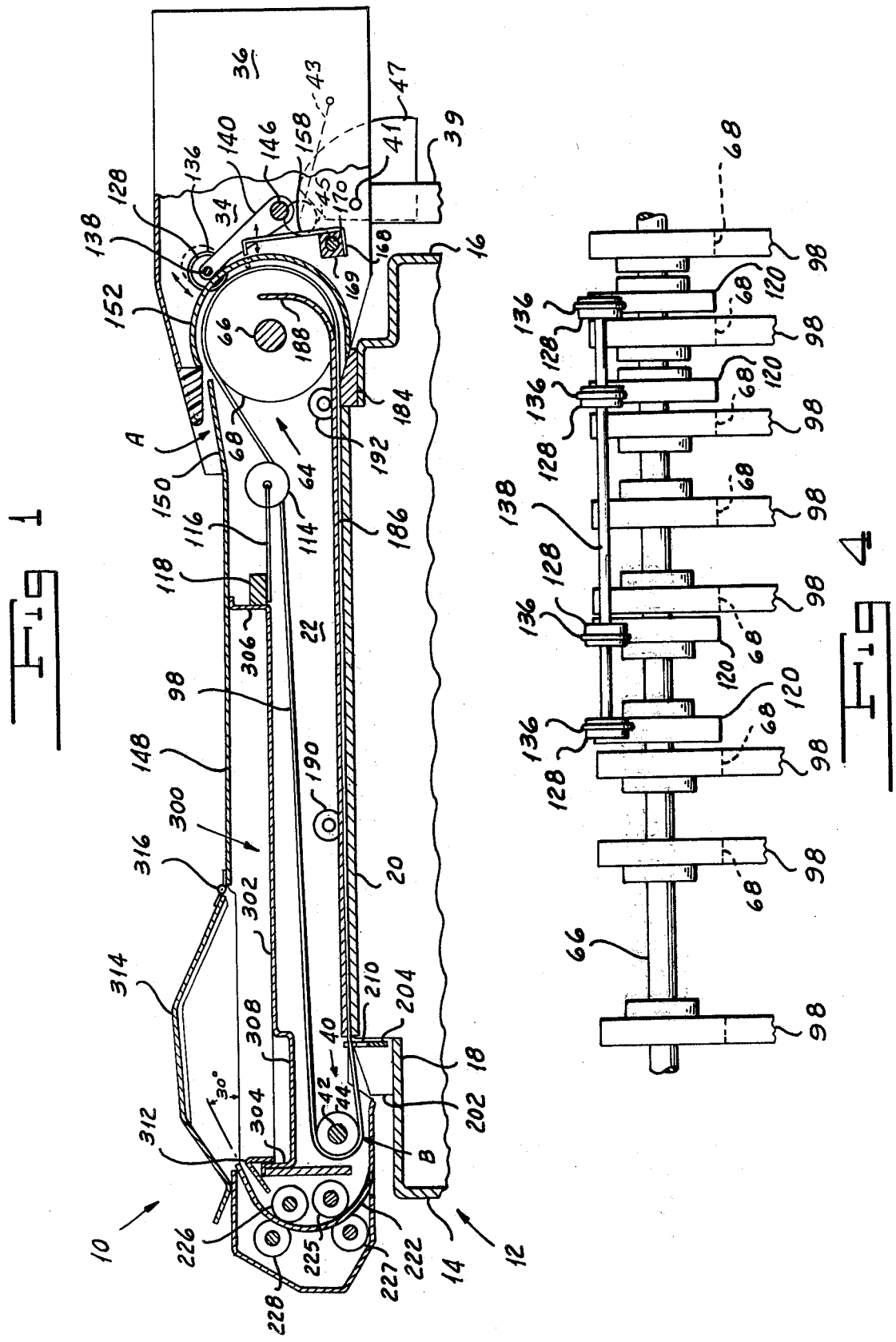

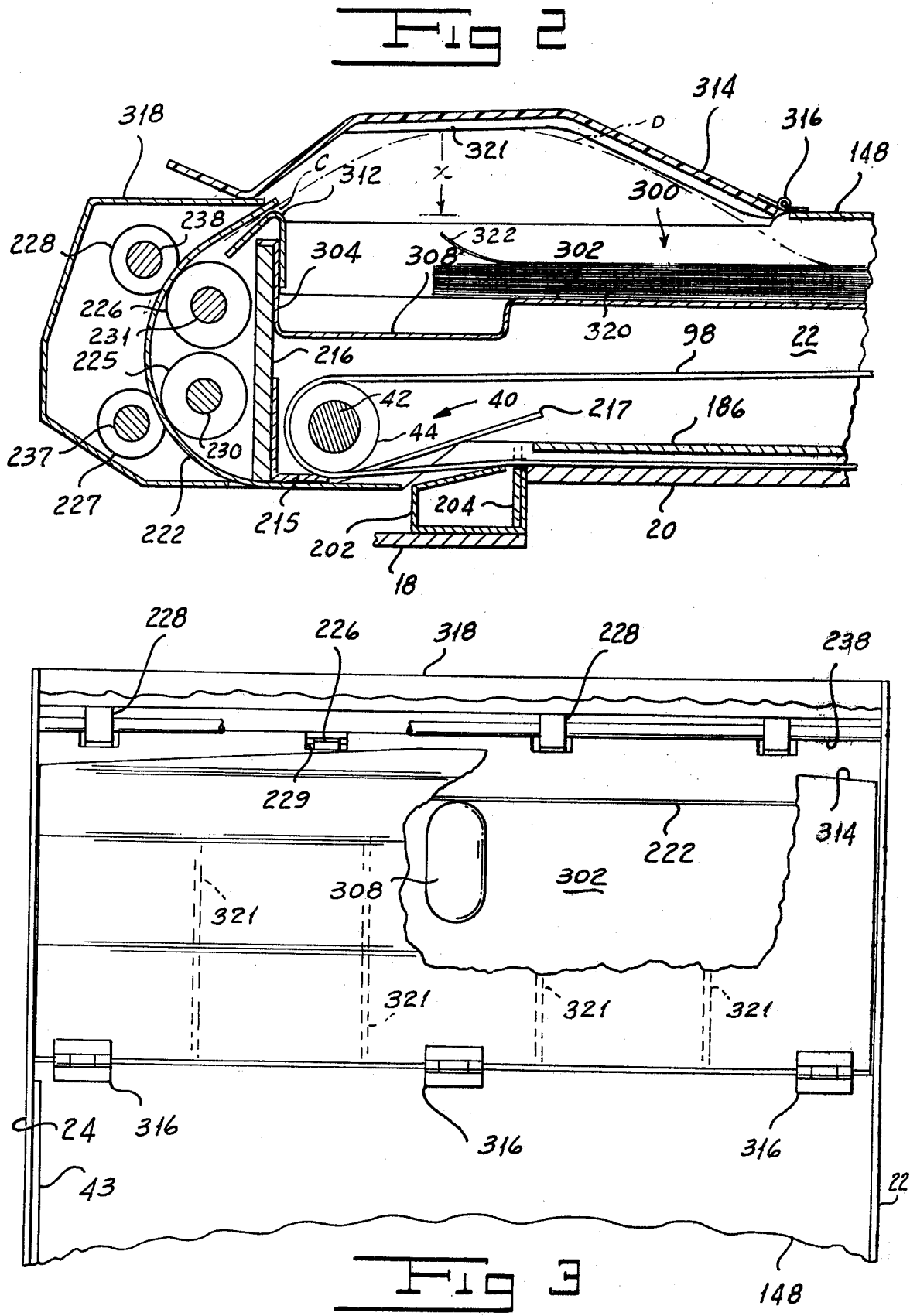

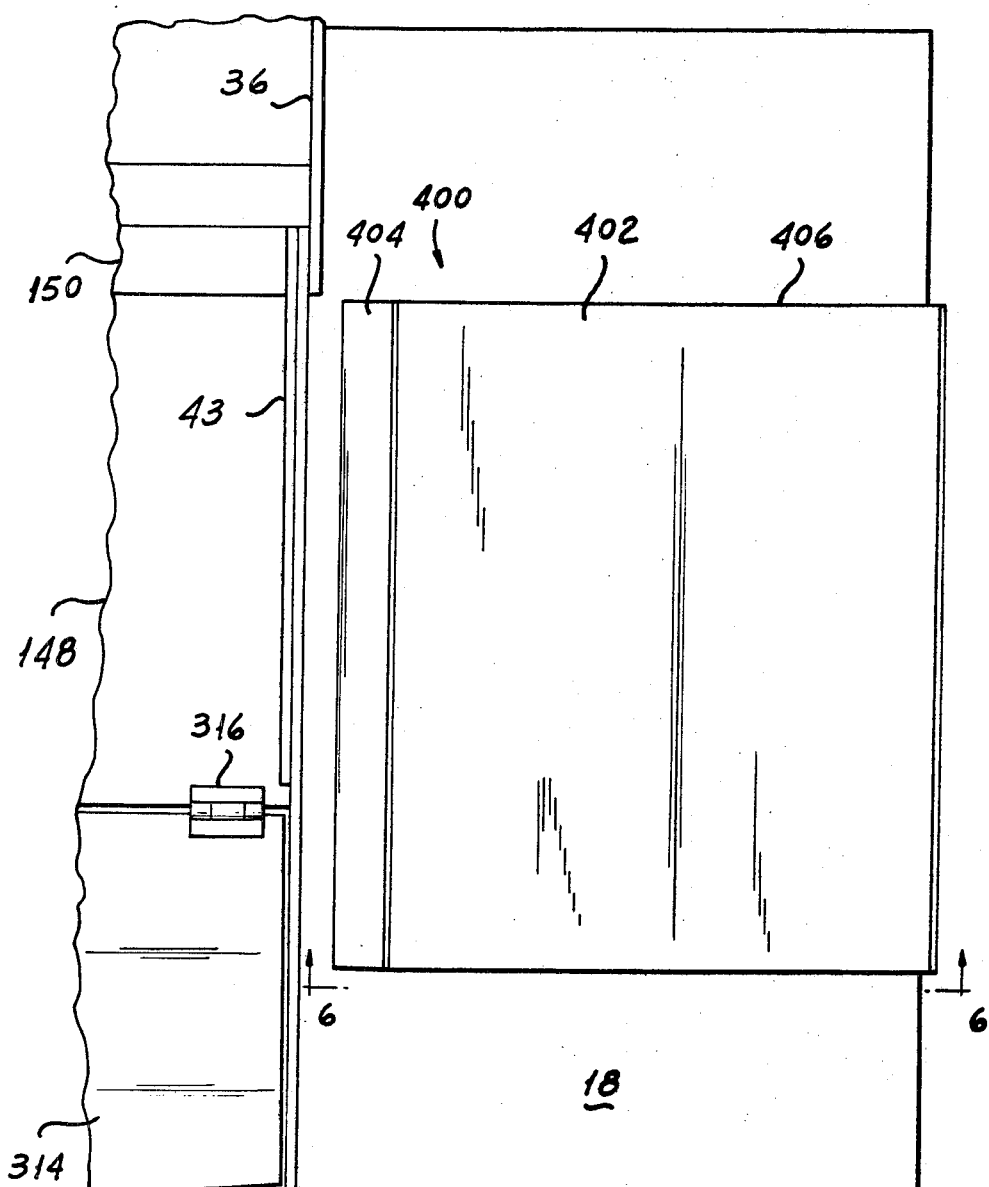
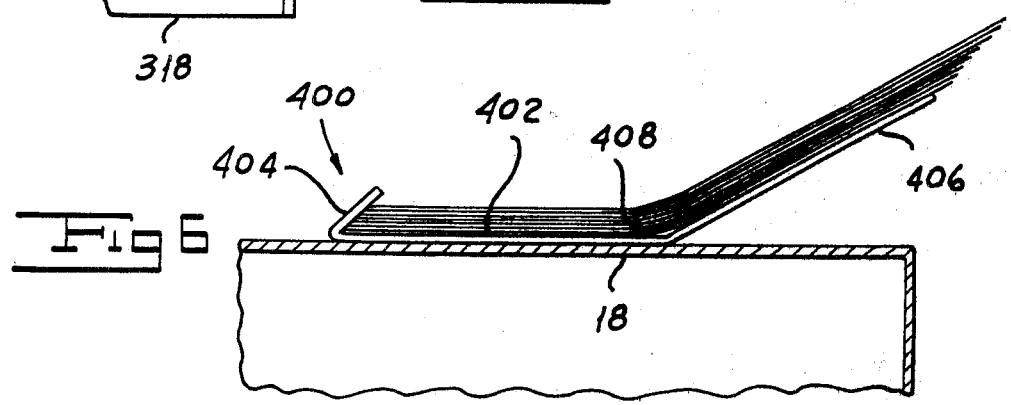

SEMIAUTOMATIC DOCUMENT FEEDER

BACKGROUND OF THE INVENTION

This invention relates to a document feeder for use with a photocopying machine having an upwardly facing imaging platen.

In our copending application Ser. No. 624,860, filed Oct. 22, 1975, now U.S. Pat. No. 4,023,791 we have described a document feeder in which original documents are moved across the machine imaging platen by a plurality of parallel spaced belts supported by first and second pulley assemblies, each of the belts having a lower traverse running across the platen. Documents introduced to the feeder through an entrance port located near the top of one of the pulley assemblies are guided around the pulley assembly onto a lower transport path defined by the plurality of belts and the imaging platen and are stopped for copying by a plurality of upwardly extending fingers disposed along the opposite edge of the imaging platen; the fingers are selectively movable between the belts into and out of the path of a document following the transport path. In one of the embodiments shown in our copending application, documents moved past the fingers are guided upwardly and backwardly along a curved path extending somewhat over 180° to a discharge mouth from which documents are discharged into a stacking tray disposed above the belts and the imaging platen.

Our invention relates to an improved stacking means for the above-described document feeder or, more generally, for any document feeder in which documents are fed from below a stacking tray into the tray at one end thereof. We have found that when originals having upwardly turned ends are discharged into the stacking tray, the ends may extend into the delivery path followed by subsequently discharged documents, interfering with delivery and possibly causing crumpling of the documents and jamming. Although increasing the height of the discharge port or mouth relative to the bottom wall of the stacking tray might be thought to solve this particular problem, such an expedient not only increases the bulk of the feeder but also increases the chances that the loading edge of the document will curl under during delivery. Moreover, as a matter of fact it does not solve the problem of possible interference with a document already in the bin or tray.

SUMMARY OF THE INVENTION

One of the objects of our invention is to provide a document feeder which inhibits jamming of a document being fed into a storage tray with a curled document already in the tray.

Another object of our invention is to provide a document feeder which is conveniently manually fed.

Another object of our invention is to provide a document feeder which is both certain in operation and physically compact.

Still another object of our invention is to provide a document feeder that prevents documents from curling under while being stacked.

Other and further objects of our invention will appear in the following description.

In general, our invention contemplates the provision, in a document feeder which moves documents across an upwardly facing imaging platen, of a stacking tray disposed above the platen and in substantially parallel spaced relationship therewith, a first guide for guiding a document moving off said imaging platen at one edge thereof along an upwardly extending curved path and discharging the documents at one end of the stacking tray along an upwardly and rearwardly directed trajectory, and a second guide for intercepting documents discharged along the trajectory at a location sufficiently spaced above the top of the tray and to the rear of the outlet of the first guide to prevent interference with a bent or curled document already in the tray and guiding the documents downwardly into said stacking tray. Preferably the first guide comprises a fixed guide member, while the second guide is formed as a hinged top cover to the stacking tray.

BRIEF DESCRIPTION OF THE DRAWINGS

In the accompanying drawings to which reference is made in the instant specification:

FIG. 1 is a sectional view of one embodiment of our improved document feeder.

FIG. 2 is a sectional view of the front portion of the embodiment of FIG. 1, drawn on an enlarged scale.

FIG. 3 is a fragmentary top plan view of the front portion of the embodiment shown in FIG. 1.

FIG. 4 is a fragmentary top plan view of the rear pulley assembly of the embodiment shown in FIG. 1, with parts omitted.

FIG. 5 is a fragmentary top plan view of the holding tray of the embodiment shown in FIG. 1.

FIG. 6 is a fragmentary sectional view of the holding tray taken along line 5—5 of FIG. 5.

DETAILED DESCRIPTION OF THE PREFERRED EMBODIMENT

Referring now to the drawings, our document feeder, indicated generally by the reference character 10, is designed to rest upon a photocopying machine, indicated generally by the reference character 12, having a front wall 14, a rear wall 16, and a top wall 18 which supports a glass imaging platen 20. The machine 12 is of the type in which the leading side edges of documents to be copied are positioned at and aligned along the front edge of the machine platen 20 and are longitudinally aligned with the right edge of the platen 20. Machines having a left-edge alignment may be accommodated simply by reversing the parts of the feeder. The feeder 10 includes a left side panel 22 and a right side panel 24 extending generally along the sides of the imaging platen 20. A pair of left and right rear side panels 34 and 36 of the feeder frame are secured to the rear portions of the panels 22 and 24, respectively. Brackets 39 on the machine 12 carry pivot pins 41 extending into feeder frame rear side panels 34 and 36 to permit the entire feeder assembly to be swung away from the imaging platen 20 to permit thick originals such as books to be copied. A leaf spring 43 urges a cam follower 45 against a cammed surface 47 fixedly attached to the brackets 39 to provide a detent in the lowered position of the feeder 10. A suitable microswitch (not shown) may be used to sense when the feeder 10 is in the lowered position. Right side panel 24 is additionally provided with a sheet aligner 43 fastened to the inner surface of the upper rear portion of panel 24.

The conveyor of our document feeder includes a front pulley assembly indicated generally by the reference character 40 comprising a shaft 42 rotatably supported between panels 22 and 24 and a plurality of pulleys 44 mounted on the shaft 42 at spaced locations therealong. A rear pulley assembly indicated generally by the reference character 64 includes a shaft 66 rotatably supported between panels 34 and 36 and a plurality of pulleys 68 mounted at spaced locations on the shaft 66.

A plurality of individual drive belts 98 are supported between respective pulleys of the front and rear pulley assemblies 40 and 64 to form a conveyor loop. Preferably, the belts of the conveyor loop are approximately ½ inch wide by 1/64 inch thick and are made of cloth-based neoprene or of cloth-based synthetic rubber sold by E. I. duPont de Numours & Co. under the trademark "HYPALON". A plurality of flanged tensioning pulleys 114 rotatably mounted on the ends of resilient metal strips 116, the other ends of which are secured to a support bar 118 extending between side panels 22 and 24, provide belts 98 with a suitable amount of tension.

When a document such as a sheet of paper is to be copied, it is placed face up on a platform 148 supported between side panels 22 and 24. The sheet is then advanced manually along the platform 148 in a direction transverse to the sheet length to a document intake port A located adjacent to the upper end of the second pulley assembly 64. Preferably, the platform 148 is provided with a ramp 150 at the rear thereof to give the document some rigidity as it enters the feeder through the document intake port A. The document is then directed around the pulley assembly 64 along a transport path defined by a cylindrical guide 152.

Preferably, the documents are supplied to the platform 148 from a stacking tray 400 disposed to the right of the feeder 10 as shown in FIGS. 5 and 6. The tray 400 comprises a horizontal rectangular portion 402 secured to the top wall 18 of the copier 12, a retaining lip 404 extending upwardly along the edge of the horizontal portion 402 adjacent to the feeder 10, and an upwardly inclined end portion 406 extending along the edge of the horizontal portion 402 distant from the feeder 10. Preferably, the tray 400 is formed integrally from a single sheet of metal. The retaining lip 404 is preferably turned back toward the horizontal portion to form an angle of 45°, while the end portion 406 is preferably inclined upwardly at about 30°. Documents forming a stack 408 are placed in the tray 400 face up with a side edge against the retaining lip 404 as shown in FIG. 6. The upwardly inclined portion 406 biases the documents against the lip 404, while the lip 404 and the inclined portion 406 together act to separate the raised side edges of the documents forming the stack 408. The placement of the tray 400 relative to the feeder 10 allows the operator to supply documents to the platform 148 from the tray with a simple hand motion in which the documents are simultaneously flipped over and rotated 90° horizontally.

A plurality of fingers 158 are selectively moved through suitable openings in the cylindrical guide 152 and across the transport path defined by the guide to prevent the document from moving past a predetermined point on the path. Fingers 158 are preferably stamped or are otherwise formed from a single piece 168 of metal or other material. We secure this member to a metal block 169 carried by a shaft 170 rotatably mounted in panels 34 and 36 to permit pivotal movement of the fingers 158 into and out of the document transport path.

A plurality of low-friction drive rollers 120, mounted on the rear pulley assembly shaft 66 at spaced locations from the right end thereof as viewed in FIG. 4 and having the same diameter as pulleys 68, assist in driving a document around the transport path defined by cylindrical path 152. These rollers coact with a plurality of pressure rollers 128 preferably having a somewhat smaller diameter and preferably provided with rubber tires 136 to provide a high-friction working surface. We mount pressure rollers 128 on a shaft 138 for rotation therewith at spaced locations therealong corresponding to the locations of rollers 120. Shaft 138 is received by a plurality of pivot arms 140 to allow the shaft 138 to pivot relative to a shaft 146. Shafts 138 and 146 and pivot arms 140 are disposed in such a manner as to permit pressure rollers 128 to engage drive rollers 120 along a line intermediate the intake port A and the fingers 158. As is more fully pointed out in out copending application referred to hereinabove, there are three arms 140 between shafts 146 and 138. Only the center arm 140 provides torque for applying pressure. The outboard arms 140 (not shown) are loosely carried by shaft 146 and act merely as spacer guides for shaft 138. Thus, the shaft assembly of 138 is allowed to pivot or float a limited amount about the center arm 140. This allows the rubber-tired rollers 136 to self-adjust themselves so that pressure on all rollers is even. It will be appreciated that cylindrical guide 152 is provided with slots (not shown) to permit engagement of the pairs of rollers 120 and 128.

Normally, the above-described document intake assembly is maintained in a disengaged position, shown in FIG. 1 in broken lines, in which the pressure rollers 128 are disengaged from the drive rollers 120 and documents are prevented from further movement along the transport path by fingers 158. When the intake assembly is in such a disengaged position, the operator may manually insert a sheet of paper into the feeder through the intake port A and align its leading edge against the fingers 158. When the feeder is ready to accept a document for copying, fingers 158 are moved away from the transport path while pressure rollers 128 are simultaneously moved into engagement with drive rollers 120 to propel the document along the transport path.

Upon emerging from the lower end of the dylindrical guide 152, the document follows a path defined by the imaging platen 20 and a rear edge plate 184 and by a guide plate 186 mounted between side panels 22 and 24 in closely spaced parallel relationship with the imaging platen 20. Guide plate 186 extends over the imaging platen 20 and over the edge plate 184 and has a plurality of fingers 188 extending generally upwardly and rearwardly between drive rollers 120 and pulleys 68 to minimize the possibility of the document being fed to the upper side of the guide plate 186.

A plurality of respective front and rear pressure rollers 190 and 192 positioned opposite the inner belts 98 maintain the document in a close contacting relationship with the imaging platen 20 as it advances across the platen's upper surface. Rollers 190 and 192 are biased downwardly against the belts 98 by weights or the like (not shown). We provide guide plate 186 with holes at the appropriate locations to permit front and rear pressure rollers 190 and 192 to contact the belts 98.

A gate 204 is provided along the front edge of the platen 20 for stopping documents for copying. The gate 204, which is enclosed in a housing 202 mounted on the machine upper surface 18, comprises a plurality of upwardly extending fingers 210 which are normally biased away from the belts 98 but may be moved upwardly between said belts to prevent further forward motion of a document along the platen 20. The gate may be actuated by any suitable means such as a solenoid as is more fully described in our copending application referred to hereinabove.

The document is moved along the platen 20 by the drive belts 98 until the leading edge of the paper document abuts the gate fingers 210 which stop it. The drive belts 98 then slip relative to the document while at the same time providing a gentle force which aligns the leading edge of the document against the fingers if it has become skewed.

When the desired number of copies have been made, the gate 204 is deactuated to retract the fingers 210 from the transport path to allow the document to be moved away from the belts 98 at a separation point B. A guide plate 215 carried by a support member 216 has fingers 217 which extend rearwardly and upwardly between adjacent belts 98 to ensure that a document is separated at the separation point B and is not carried around by the belts. The separated documents are directed by an upwardly curved guide 222 into a stacking tray 300 disposed above and in substantially parallel relationship with the belts 98 and the imaging platen 20. The discharged document is moved along the inner surface of the guide 222 by a first plurality of drive rollers 225 disposed across said inner surface and by a second plurality of drive rollers 226 disposed across the inner surface at a location spaced downstream from the first plurality of rollers 225. Rollers 225 and 226 engage first and second pluralities of idler rollers 227 and 228, respectively, mounted opposite the respective rollers 225 and 226 on the other side of the guide 222. Guide 222 is provided with slots 229 at suitable locations to permit rollers 227 and 228 to contact rollers 225 and 226, respectively. Rollers 225 and 226 are mounted on shafts 230 and 231 rotatably received by side panels 22 and 24. Shafts 230 and 231 are driven by any suitable means such as a chain drive (not shown). Rollers 227 and 228 are rotatably mounted on shafts 237 and 238 mounted between the side panels 22 and 24.

A more detailed disclosure of the structure and operation of the basic document feeder may be found in the copending application referred to hereinbove, which application is hereby incorporated by reference. It should be emphasized, however, that our improved stacking means disclosed herein is not limited to the feeder disclosed in that application, but may be employed in any feeder in which documents are moved into a stacking tray located above an upwardly facing image platen.

The stacking tray 300 inclues a bottom wall 302 and respective end walls 304 and 306, the walls 302, 304 and 306 preferably being integrally formed from a single sheet of metal or other material. Preferably the bottom wall 302 is formed with one or more depressions 308 to facilitate insertion of the fingers to remove a stack of documents. End walls 304 and 306 are mounted on respective support members 216 and 118. We secure a guide 312 to the end wall 304 to form a discharge port C at the upper end of the document guide 222. Guide 312 forms a baffle which prevents the machine operator from inadvertently inserting his fingers into the path of moving parts adjacent to the document guide path.

The stacking tray 300 includes a cover 314, preferably formed of a transparent plastic, whose rear end is pivotally attached to front edge of the ramp 148 by hinges 316 or the like for movement between an open position at which the tray 300 is accessible and a closed position at which the front edge rests on the top of front panel 318. Preferably, the underside of the cover 314 is formed with a plurality of longitudinal ribs 321 to prevent the document from directly rubbing against the cover 314 and becoming electrostatically charged. The ribs 321 are about 1/16 inch wide and are spaced about 2 inches apart in the embodiment shown. The central portion of the cover 314 between its front and rear edges is spaced a certain distance x above the top of the tray 300 and, preferably, extends rearwardly beyond the front edge of a stack of documents 320 already in the tray 300. The rearward extent of the central portion and the spacing x are such that a document 320 emerging from the discharge port C follows the path D shown in FIG. 2. In this way we substantially obviate the possibility that a document being fed into the tray will interfere with the upturned edge 322, for example, of a document 320 already in the tray 300. The shape of the cover also minimizes the possibility that the leading edge of the document will curl under during delivery. Any misfeed that may occur is easily observable through the transparent plastic cover. To remove stacked documents or to correct any misfed, the cover is simply swung upwardly for access to the tray's interior.

It will be seen that we have accomplished the objects of our invention. We have provided a document feeder which inhibits interference between a document already in a storage tray and a document being fed to the tray. Our document feeder is more certain in operation than are document feeders of the prior art. Our document feeder is compact for the result achieved thereby.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In a document feeder for a photocopying machine having a generally horizontal imaging platen adapted to receive a document to be copied, said feeder including a stacking tray disposed above said imaging platen, apparatus comprising first guide means adjacent to one end of said platen for guiding a document moving off said one end of said platen along a curved path having an exit portion extending generally upwardly and in the direction of said tray and second guide means spaced above said tray for engagement by the leading edge of said document and for guiding said document into said tray, at least part of said second guide means comprising a transparent member formed with spaced longitudinal ribs on the underside thereof.

2. Apparatus as in claim 1 in which said transparent member is substantially nonconductive.

3. Apparatus as in claim 1 in which said transparent member comprises plastic.

4. Apparatus as in claim 1, further comprising intake means disposed at the other end of said imaging platen for guiding a document moved from the direction of said one end along a downwardly curved path and onto said platen toward said one end.

5. Apparatus as in claim 4, further comprising a platform disposed in substantially parallel relationship with said imaging platen, said platform having one end disposed along the end of said second guide means remote from said first guide means, said intake means guiding a document moved off said other end of said platform along said path.

6. Apparatus as in claim 5 in which the other end of said second guide means is pivotally attached to said one end of said platform.

7. Apparatus as in claim 1 in which the edge of said second guide means remote from said first guide means is pivotally attached to said stacking tray.

8. In a document feeder for a photocopying machine having a generally horizontal imaging platen adapted to receive a document to be copied, said feeder including a stacking tray disposed above said imaging platen, apparatus comprising first guide means adjacent to one end of said platen for guiding a document moving off said one end of said platen along a curved path having an exit portion extending generally upwardly and in the direction of said tray, second guide means spaced above said tray for engagement by the leading edge of said document and for guiding said document into said tray, said second guide means being formed with spaced longitudinal ribs and having an end remote from said first guide means, and means for attaching said second guide means at said remote end of said tray for pivotal upward movement of said second guide means to provide access to the interior of said tray.

9. Apparatus as in claim 8 in which said second guide means extends in the direction of the other end of said platen to a location beyond the edge of a stack of documents in said tray adjacent to said one end of said platen.

10. Apparatus as in claim 8 in which said second guide means is transparent.

11. Apparatus as in claim 8 in which one edge of said second guide means overhangs the upper portion of first guide means.

12. Apparatus as in claim 8 in which the bottom wall of said stacking tray is formed with a recess for inserting the fingers to remove documents discharged into said stacking tray.

13. Apparatus as in claim 8 in which said second guide means has a raised central portion between the end adjacent to the first guide means and the end remote from the first guide means.

14. Apparatus as in claim 8 in which the upper end of the first guide means is substantially level with the top of the stacking tray.

15. Apparatus as in claim 8 in which the spacing of the second guide means above the stacking tray is substantial compared with the depth of said tray.

16. In a document feeder for a photocopying machine having a generally horizontal imaging platen adapted to receive a document to be copied, said feeder including a stacking tray disposed above said imaging platen, apparatus comprising first guide means adjacent to one end of said platen for guiding a document moving off said one end of said platen along a curved path having an exit portion extending generally upwardly and in the direction of said tray, second guide means spaced above said tray for engagement by the leading edge of said document and for guiding said document into said tray, said second guide means having an end remote from said first guide means, a platform disposed in substantially parallel relationship with said imaging platen, said platform having one end disposed along the end of said second guide means remote from said first guide means, intake means disposed at the other end of said imaging platen for guiding a document moved off the other end of said platen from the direction of said one end of said imaging platen along a downwardly curved path and onto said platen toward said one end, and means for attaching said second guide means at said remote end of said tray for pivotal upward movement of said second guide means to provide access to the interior of said tray.

17. In a document feeder for a photocopying machine having a generally horizontal imaging platen adapted to receive a document to be copied, said feeder including a stacking tray disposed above said imaging platen, apparatus comprising first guide means adjacent to one end of said platen for guiding a document moving off said one end of said platen along a curved path having an exit portion extending upwardly and in the direction of said tray, second guide means spaced above said tray for engagement by the leading edge of said document and for guiding said document into said tray, means for attaching said second guide means to said tray in such a manner as to provide access to the interior of said tray between said first and said second guide means, intake means disposed at the other end of said imaging platen for guiding a document moved from the direction of said one end along a downwardly curved path and onto said platen toward said one end, and a platform disposed in substantially parallel relationship with said imaging platen, said platform having one end disposed along the end of said second guide means remote from said first guide means, said intake means guiding a document moved off said other end of said platform along said path.

18. In a document feeder for a photocopying machine having a generally horizontal imaging platen adapted to receive a document to be copied, said feeder including a stacking tray disposed above said imaging platen, apparatus comprising first means adjacent to one end of said platen for guiding a document moving off said one end of said platen along a curved path having an exit portion extending upwardly and in the direction of said tray, second means for guiding said document, and means for mounting said second means in a normal position over said tray and in spaced relationship thereto in the path of movement of a document leaving the exit portion of the first means for engagement by the leading edge of the document to direct said leading edge downwardly into said tray, said mounting means permitting movement of said second means to a position remote from said normal position to permit access to documents in the tray, intake means disposed at the other end of said imaging platen for guiding a document moved from the direction of said one end along a downwardly curved path and onto said platen toward said one end, and a platform disposed in substantially parallel relationship with said imaging platen, said platform having one end disposed along the end of said second means remote from said first means, said intake means guiding a document moved off said other end of said platform along said path.

19. Apparatus as in claim 18 in which said mounting means provides access to said tray between said first and second means.

20. Apparatus as in claim 18 in which said second means is movable in the direction of the other end of the imaging platen.

* * * * *

UNITED STATES PATENT AND TRADEMARK OFFICE
CERTIFICATE OF CORRECTION

PATENT NO. : 4,129,295
DATED      : Dec. 12, 1978
INVENTOR(S) : Tatsu Hori, Kenneth W. Gardiner and Norman F. Mangal It is certified that error appears in the above-identified patent and that said Letters Patent are hereby corrected as shown below:

Column 8, line 2, "platen" should read -- platform --.

Signed and Sealed this

Twenty-seventh Day of March 1979

[SEAL]

Attest:

RUTH C. MASON
Attesting Officer

DONALD W. BANNER
Commissioner of Patents and Trademarks